March 7, 1950  E. UTTERBACK ET AL  2,499,704
PROCESS FOR HEATING GRANULAR SOLIDS
Filed June 28, 1946  4 Sheets-Sheet 4
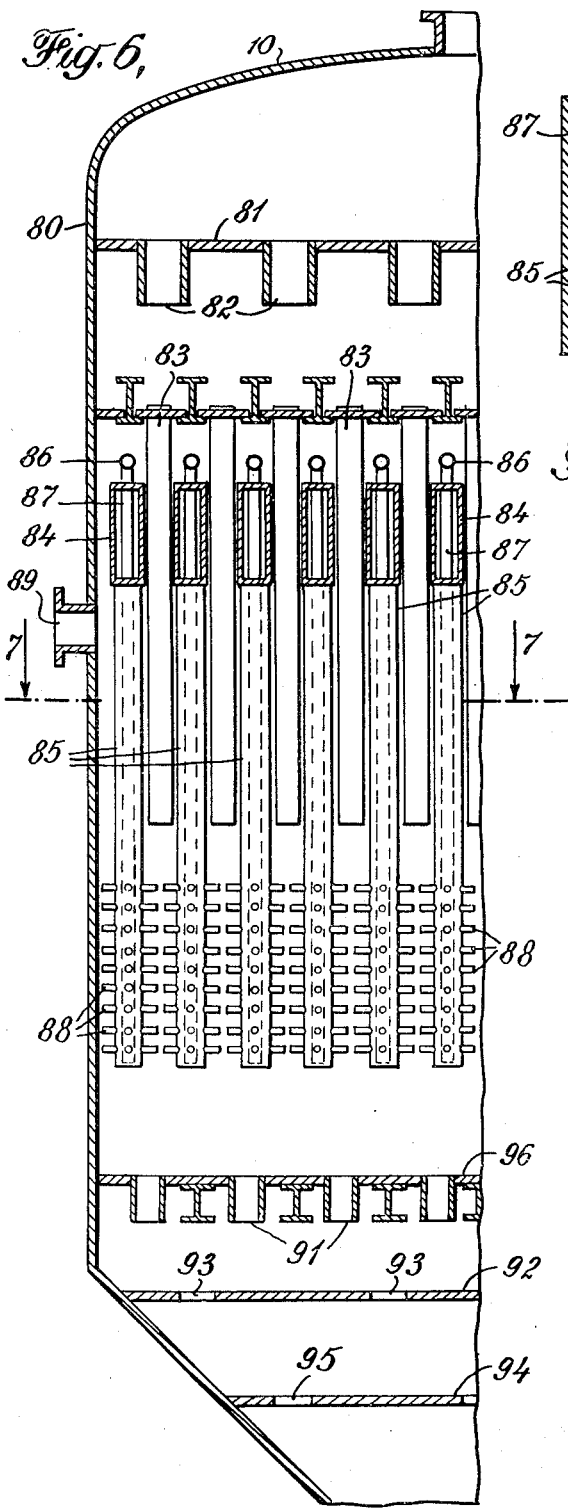
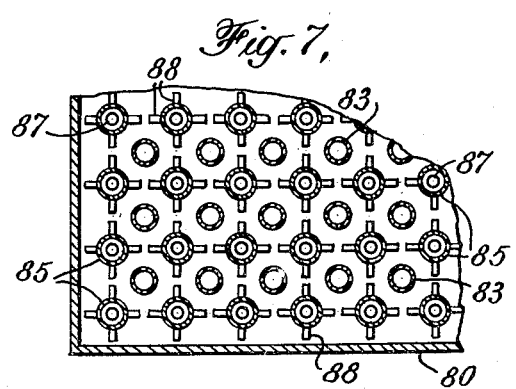
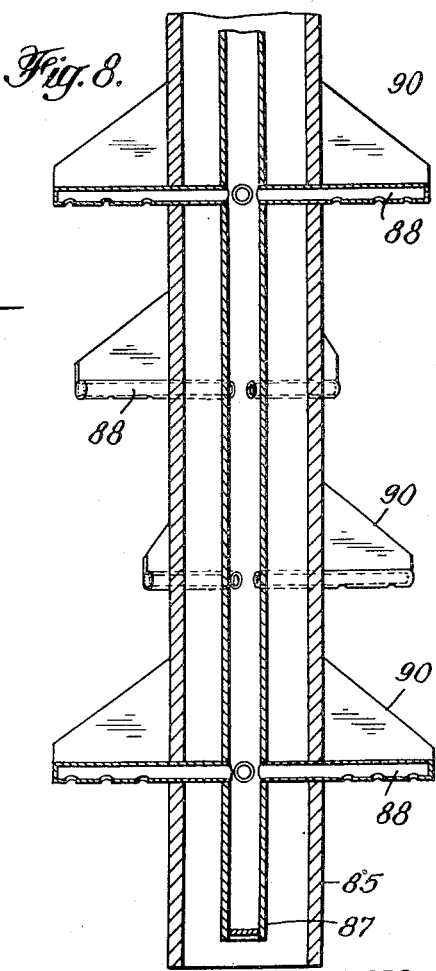
INVENTORS
ERNEST UTTERBACK
AND ERIC V. BERGSTROM
BY
ATTORNEY Patented Mar. 7, 1950

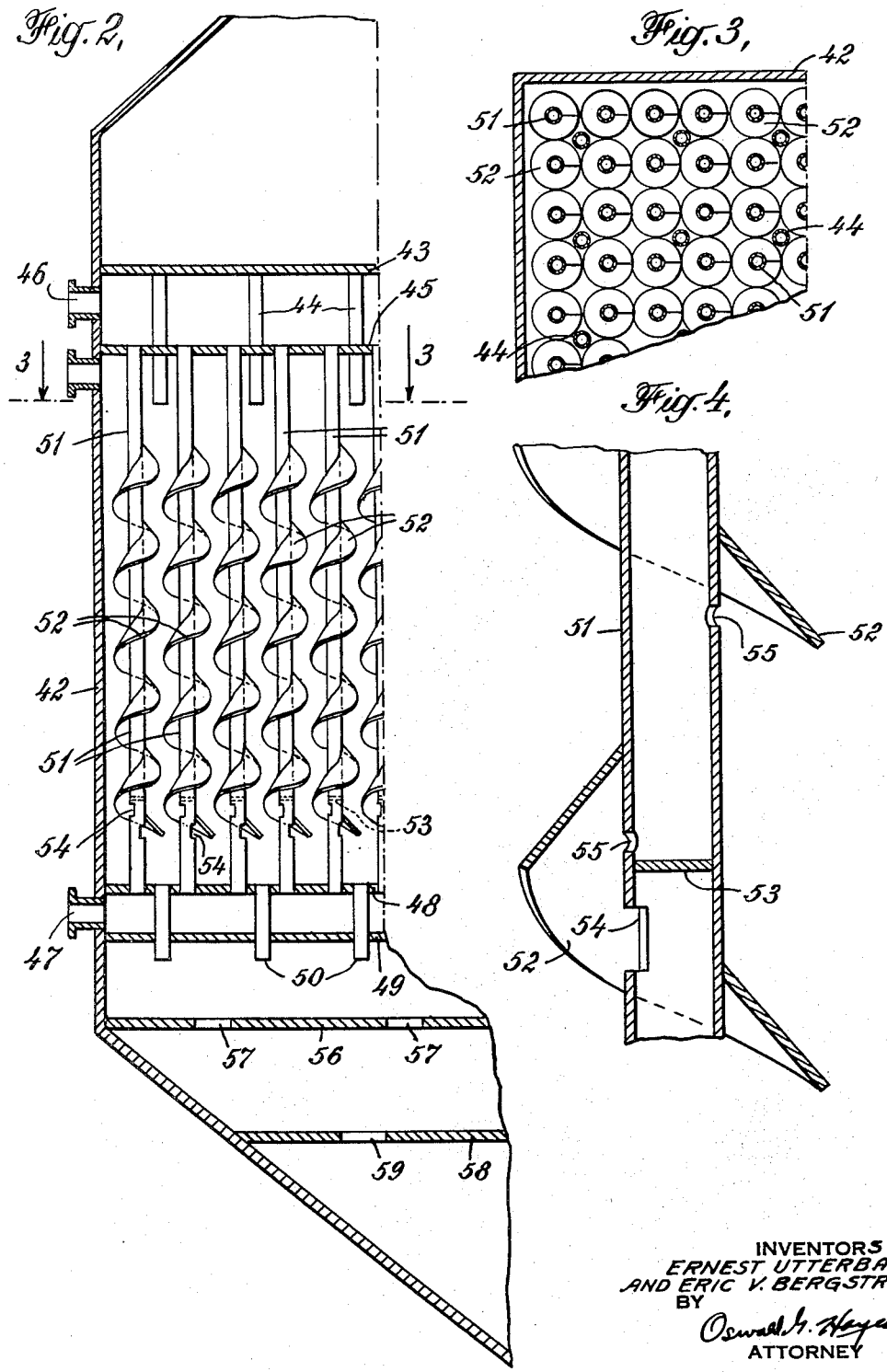

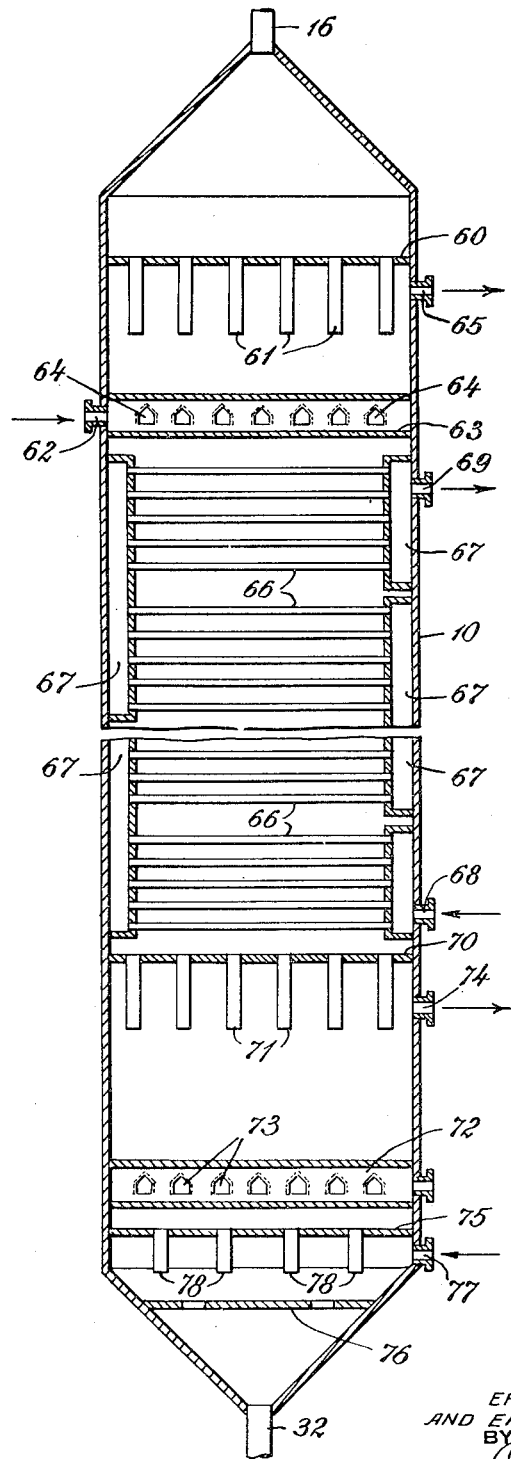

2,499,704

UNITED STATES PATENT OFFICE 2,499,704

PROCESS FOR HEATING GRANULAR SOLIDS

Ernest Utterback, New York, N. Y., and Eric V. Bergstrom, Short Hills, N. J., assignors to Socony-Vacuum Oil Company, Incorporated, a corporation of New York Application June 28, 1946, Serial No. 679,894

4 Claims. (Cl. 263—52)

This invention relates to a method for raising the temperature of a granular solid heat transfer material by direct contact with the heating flame. According to the invention, the heating flame is generated in relatively small increments in direct contact with the granular solid, whereby the flame temperature is maintained below the point at which damage to the granular solid by fusion may occur.

The process of this invention is well adapted to the heating of granular solid heat transfer material to be used in a subsequent zone for rapid heating of a fluid medium. For example, the invention may be used in combination with a suitable reactor for the production of light gaseous olefins by the cracking of heavier hydrocarbons at high temperature and short contact time. A typical reaction of this type is the cracking of gas oil at 1500° F. for a reaction period on the order of 0.2 second to produce 30% by weight of ethylene and other valuable products.

Efficient rapid heating of granular solid heat transfer material is advantageously accomplished by production of a flame in direct contact with a mass of the granular solid to be heated. In order to put into the granular mass a sufficient amount of heat, considerable fuel must be burned and the risk is encountered that small areas of high flame temperature will result in fusion of the heat transfer agent thus causing modification in sizes and shapes of the granules and possible agglomeration of granules to destroy design flow characteristics.

According to the present invention, this risk is overcome by generation of the flame in a moving bed of granular material by the addition of one of the flame components in relatively small increments along the path of flow of products of combustion. By this means, heat generated by combustion at any given point is dissipated in part thus cooling the products of partial combustion and the next increment is insufficient to raise the temperature of the total mass to dangerous levels.

Preferably, the air is totally introduced at one level in a downwardly moving bed and passed longitudinally of the bed with addition thereto of a fluid fuel at a plurality of points along the path of gaseous flow. It will be apparent that this order of introduction may be reversed with introduction of the total quantity of the fuel at one point and incremental introduction of air; but in general the air required is considerably greater in volume than the volume of fuel and flow is more nearly uniform from one end of the bed to the other when the component totally introduced at one level is air. An advantageous modification of the invention contemplates passing the hot products of combustion in indirect heat exchange relationship with at least one of the flame components to preheat the same. Where this heat exchange is conducted subsequent to contact with the bed of granular material, it serves to act as an economizer.

Types of apparatus and specific process modifications falling within the scope of this invention are described and claimed in application Serial No. 666,053, filed April 30, 1946, and application Serial No. 657,590, filed March 27, 1946. The latter application is now Patent No. 2,432,503, dated December 16, 1947.

The objects and advantages of the invention will appear more clearly from consideration of specific modifications thereof illustrated in the annexed drawings, wherein Figure 1 is a diagrammatic showing of apparatus for cracking hydrocarbons for the production of ethylene;

Figure 2 is a partial vertical section through a heater embodying the principles of this invention;

Figure 3 is a partial section on line 3—3 of Figure 2;

Figure 4 is a detail partial section of the flame producing assembly of Figure 2;

Figure 5 is a vertical section of a suitable reactor;

Figure 6 is a partial vertical section of another form of heater corresponding to the invention hereof;

Figure 7 is a partial section on line 7—7 of Figure 6; and

Figure 8 is a section, in detail, of a burner tube assembly suitable for use in the heater of Figure 6.

Figure 1:
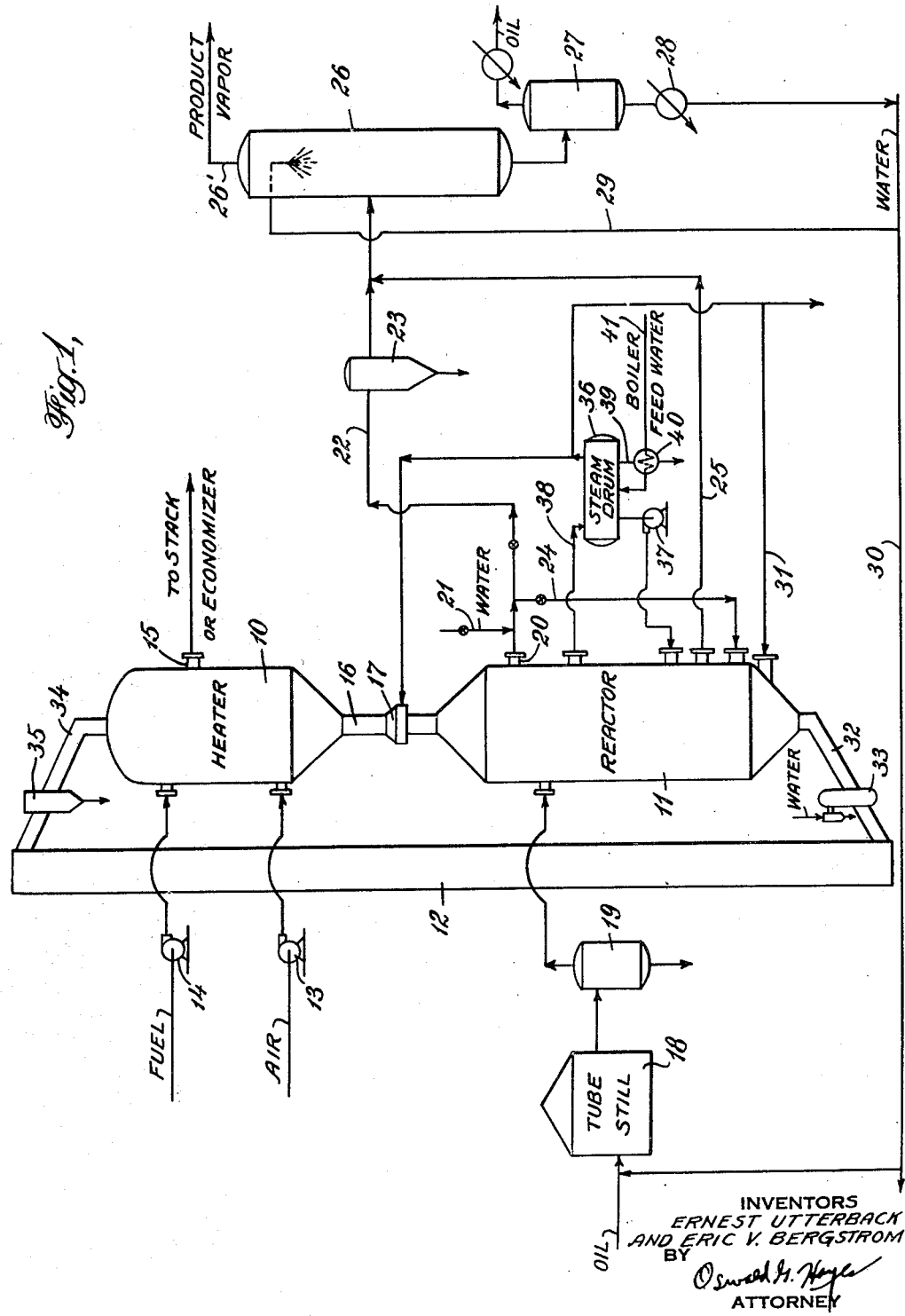

Referring specifically to Figure 1, a suitable granular solid such as fused alumina pellets having an average diameter of about 0.3 inch is circulated in a closed path including a heater 10, a reactor 11, and an elevator 12. Fuel and preheated air are admitted from pumps 13 and 14 respectively to the heater 10 wherein a flame produced by combustion of the fuel heats the moving bed of granular solids in heater 10, exhaust gases being withdrawn at 15 and passed to a suitable stack or economizer. The highly heated solids flow downwardly through a feed leg 16 through a steam sealing zone 17 to the reactor 11 wherein they are contacted with a fluid charge such as preheated oil vapors from tube still 18 and vapor separator 19. The highly heated vapors are withdrawn at 20 and are then preferably quenched to a temperature which will substantially reduce the reaction velocity by water introduced from line 21.

The apparatus shown here is capable of conducting the major quench by water from line 21 after which the vapors are transferred by line 22 to a tar separator 23, from which the vapors may be conducted to further purification steps as described hereafter in connection with the preferred operation. According to the preferred embodiment the partially quenched vapors are conducted by line 24 to the lower part of the reactor 11 wherein they are passed in direct contact with cold granular solid and are withdrawn by line 25 and transferred to a spray condenser 26 wherein a spray of water or other suitable medium such as cold oil, reduces the temperature of the vapors to a point at which normally gaseous products may be separated from normally liquid materials, say 100° F. The normally gaseous material is withdrawn from condenser 26 by overhead line 27 and passed to a suitable gas plant for recovery and purification of its components. A mixture of water and oil is withdrawn from the bottom of condenser 26 and passed to a settler 27 from which oil is withdrawn, cooled and treated to recover various components such as aromatic gasolines and naphthas. Water withdrawn from the bottom of settler 27 is cooled in heat exchanger 28 and may then be recycled in whole or part for reuse as by line 29 to the spray condenser and line 30 which supplied water to be mixed with the oil and thus furnish steam for the reaction in view of the fact that water vapor aids the course of the reaction.

Returning now to the granular solid cycle, purging steam may be introduced to the bottom of the reactor from line 31 and the purged solids are then transferred by a conduit 32 through a depressuring pot 33 to the elevator 12. From the top of elevator 12, the solids are conveyed by a conduit 34 having a suitable separator 35 for removal of particles which have been broken down to a size smaller than that desired.

The intermediate section of the reactor is provided with heat transfer tubes for passing a heat exchange medium in indirect heat exchange relationship with the granular solids therein. A steam drum 36 supplies water for circulation through the heat transfer tubes by pump 37, vapors generated in reactor 11 being returned to the steam drum by line 38. Process steam may be drawn from the steam drum to supply steam sealing zone 17 and the steam purge line 31, leaving an excess of steam which can be diverted for other plant uses. As shown, blow-down line 39 is equipped with a heat exchanger 40 for preheating boiler feed water from line 41.

The structure of a preferred form of heater is shown in Figures 2 to 4. A shell 42 is fitted with suitable inlet and outlet means (not shown in Figure 2) to produce a moving bed of granular solids in the heater 10. The granular solids supplied at the top fall onto a tube sheet 43 which defines the lower surface of a feed hopper from which solids are withdrawn by feed pipes 44 for supply to the heating section. A manifold is provided for supplying one of the components of the flame used to heat the solids and, as shown, the manifold is defined by tube sheet 43 and plate 45. A suitable connection 46 is provided for admission of a gas to this upper manifold. A similar manifold, supplied by inlet 47 is defined at the bottom of the heating section by a tube sheet 48 and plate 49. Feed tubes 50 provide for withdrawal of granular solids from the heating section.

The heating section is provided with means for baffling the downwardly moving mass of granular solids in a manner to provide a plurality of continuous paths through the bed, which paths are substantially free of solid particles thus permitting gases to flow in direct contact with solid particles but without forcing their way through a compact bed of particles in the baffled region. Various types of baffles for this purpose are shown in U. S. Patent No. 2,227,416 issued December 31, 1940, to John W. Payne. Although any of the forms of baffling shown in that patent may be used, the helical fin baffle is particularly well adapted to the present purpose and that form is shown herein. The flame components, namely air and fuel, are supplied through the inlets 46 and 47 to the respective manifolds between which extend a number of tubes 51 for supplying the flame components to the heating section. It is desirable that the temperature of the flame produced by combustion of the fuel shall not exceed the fusion temperature of the solid, and, since the flame components are normally preheated before admission at 46 and 47 and, since those components are further preheated by passage through tubes 51, the temperature of the flame is maintained within the desired limits by introducing one of the flame components in relatively small increments thereby permitting dissipation of heat of combustion and giving a partially consumed mixture to which the next increment can be added without producing unduly hot flames.

As shown in the drawings this desirable result is achieved by introducing substantially all of one flame component from orifices in tubes 51 over a relatively short portion of the path defined by helical baffles 52 about the tubes 51. A plug 53 near the bottom of each tube 51 insures that only the lower portion of the tube is open to the lower manifold while the major portion of the tube functions as an inlet from the upper manifold. Large orifices 54 allow all the flame component from the lower manifold to be admitted over a short space of the path beneath the baffle. Above the plug 53 are a large number of smaller orifices 55 which admit the flame component from the upper manifold to the path under the helical baffle in relatively small increments. It is of course possible to introduce either flame component in increments and, as shown here, the air is introduced from the bottom and the fuel is added in small increments along the tortuous path beneath the baffle. Any fluid fuel can be used, but, due to the high temperature involved, liquid fuels tend to coke in the tubes and plug the orifices 55, for which reason gaseous fuels are much preferred. The highly heated solids are discharged from pipe 50 onto a plate 56 having openings 57 which induce equal flow from the pipes 50 adjacent thereto. Plate 58 having openings 59 functions in a similar manner to control flow from the openings 57 and thus give a constant rate of flow through the heating section.

Turning now to Figure 5, the highly heated solids pass from feed leg 16 into a hopper in the top of reactor 10 defined by a tube sheet 60 from which depend a number of feed legs 61 to give uniform feeding across the top of the reactor. The hydrocarbon charge enters by inlet connection 62 to a header 63 from which extend a plurality of feed troughs 64 open at the bottom. The charge is thus evenly distributed through the mass of hot granular solids and passes upwardly therethrough to the open space about the feed tubes 61 from which it is withdrawn by outlet connection 65. Below the header 63 are banks of heat exchange tubes 66 which communicate with a series of manifolds 67 which induce flow of the heat exchange medium through the tubes in series between inlet 68 and outlet 69. The solids cooled in this manner fall onto a tube sheet 70 from which they pass by feed tubes 71 to the quenching zone wherein they are contacted by the hot reaction mixture supplied through header 72 and distributing troughs 73. The quenched product is withdrawn from the open space about tubes 71 through an outlet connection 74. The bottom of the reactor is provided with flow control plates 75 and 76 similar in function to the elements 48, 56 and 58 of Figure 2. Purge steam is advantageously introduced by inlet 77 below plate 75 to an open space provided by tubes 78.

The heater illustrated in Figures 6 to 8 inclusive comprises a shell 80; which should be insulated in the manner well known in the art; having a tube sheet 81 from which depend a number of feed tubes 82 for supplying granular solid across the heater. The granular solid is conducted to and uniformly distributed in a downwardly moving bed by feed legs 83. One of the fuel components, for example, air, is supplied to a plurality of transverse headers 84 from which depend a plurality of drop pipes 85 to supply the air uniformly across a lower portion of the moving bed. The other flame component, for example, liquid fuel, is supplied by manifolds 86 to feed pipes 87 extending down through the drop pipes 85. The fuel is supplied to the moving bed by a plurality of lateral feed pipes 88 extending outwardly from the pipes 87. As shown, the branch pipes 88 serve to distribute the fuel uniformly across a plurality of levels in the bed and the flame is generated in increments along the bed as the air moves upwardly from the bottom of pipes 85 toward the top surface of the bed below the bottom ends of pipes 83. The products of combustion are disengaged from the upper surface of the bed and pass about the pipes 85, preheating the air, to be withdrawn at discharge port 89.

For simplicity of illustration, the branch pipes 88 are shown here as arranged in the same vertical planes from top to bottom and in each group about a single pipe 87. It is preferred, however, that the branch pipes 88 be disposed at angles to each other as shown in Figure 8. In such case, each of the branch pipes extends laterally to a point adjacent the nearest drop pipe 85. Thus, the several branch pipes 88 extending from a single pipe 87 are at different angles at different levels and, in any given level, adjacent branch pipes lie at different angles in their common plane. As shown in Figure 8, it is advisable to protect the branch pipes 88 against damage by the mass of downwardly moving granular solids. This can be accomplished by means of the generally triangular fins 90 above the branch pipes 88.

In a typical operation a mixture of steam and gas oil vapor containing about 33% by weight of water is admitted to the top section of the reactor at 625° F. Fused alumina pellets of 0.3 inch average diameter are admitted from the feed leg at 1546° F. at a solids to oil weight ratio of 11.95. The depth of bed contacted by the charge is 24 inches and a space velocity of 3.12 volumes of liquid oil at 60° F. per volume of reaction space per hour is maintained. This gives a mean effective temperature of 1440° F. at a contact time of 0.29 second. The heated reaction mixture is promptly quenched with water to reduce its temperature from 1545° F. to 1200° F. at which temperature it is transferred to the quench section and cooled therein to 572° F. The quenched reaction mixture is transferred directly to the spray condenser wherein it is cooled to 100° F. by contact with water at 90° F. Among the products produced are 28.1% by weight of ethylene together with substantial yields of other olefins. Among the liquid products are 5.5% of depentanized motor gasoline having an end point of 416° F. and an octane number of 94.6 with 3 cc. of tetraethyl lead per gallon.

The granular solid enters the heat exchange section at 1040° F. wherein it generates steam under a pressure of 175 lbs. per square inch gauge and leaves the heat exchange section at 570° F. The granular solid is heated to 765° F. in the quench section and reenters the heater at 730° F. wherein it is heated to 1575° F. for return to the reactor.

We claim:

1. A process for heating a mass of granular solid heat transfer material by direct contact with a flame generated by the flame components air fluid fuel which comprises feeding a plurality of spaced separate streams of said material to the top of a downwardly moving bed of said material in a heating zone, supplying all of one of said flame components uniformly across said bed at the same level in a lower portion of said zone, supplying the other of said flame components as a plurality of vertically spaced increments, each uniformly distributed across said bed above said lower portion, passing products of combustion so produced upwardly through said bed and removing them from contact with said material at the top surface of said bed among said streams, and removing said material in heated condition from the bottom of said bed below the supply of both of said flame components across the bed and without interference with said supply of said flame components.

2. A process for heating a mass of granular solid heat transfer material by direct contact with a flame generated by the flame components air and fluid fuel which comprises feeding a plurality of spaced separate streams of said material to the top of a downwardly moving bed of said material in a heating zone, supplying all of one of said flame components uniformly across said bed at the same level in a lower portion of said zone, supplying the other of said fuel components as a plurality of vertically spaced increments, each uniformly distributed across said bed above said lower portion, passing products of combustion so produced upwardly through said bed and removing them from contact with said material at the top surface of said bed among said streams, thereafter passing said products of combustion in indirect heat exchange relationship with at least one of said flame components to preheat the same, and removing said material in heated condition from the bottom of said bed below the supply of both of said flame components across the bed and without interference with said supply of said flame components.

3. A process for heating a mass of granular solid heat transfer material by direct contact with a flame generated by the flame components air and fluid fuel which comprises feeding a plurality of spaced separate streams of said material to the top of a downwardly moving bed of said material in a heating zone, supplying said air uniformly across said bed in a lower portion of said zone, supplying said fuel as a plurality of vertically spaced increments, each uniformly distributed across said bed above said lower portion, passing products of combustion so produced upwardly through said bed and removing them from contact with said material at the top surface of said bed among said streams, and removing said material in heated condition from the bottom of said bed below the air supply across the bed and without interference with said air supply.

4. A process for heating a mass of granular solid heat transfer material by direct contact with a flame generated by the flame components air and fluid fuel which comprises feeding a plurality of spaced separate streams of said material to the top of a downwardly moving bed of said material in a heating zone, supplying all of said fuel uniformly across said bed at the same level in a lower portion of said zone, supplying said air as a plurality of vertically spaced increments, each uniformly distributed across said bed above said lower portion, passing products of combustion so produced upwardly through said bed and removing them from contact with said material at the top surface of said bed among said streams, and removing said material in heated condition from the bottom of said bed below the fuel supply across the bed and without interference with said fuel supply.

ERNEST UTTERBACK.
ERIC V. BERGSTROM.

REFERENCES CITED

The following references are of record in the file of this patent:

UNITED STATES PATENTS

| Number | Name | Date |
|---|---|---|
| 783,903 | Skogg | Feb. 28, 1905 |
| 1,554,780 | Berrigan | Sept. 22, 1925 |

FOREIGN PATENTS

| Number | Country | Date |
|---|---|---|
| 828,944 | France | June 3, 1938 |

Certificate of Correction

Patent No. 2,499,704 March 7, 1950

ERNEST UTTERBACK ET AL.

It is hereby certified that errors appear in the printed specification of the above numbered patent requiring correction as follows:

Column 6, line 32, after the word "air" insert *and*; line 60, for "fuel" read *flame*; column 7, line 6, after "supplying" insert *all of*; line 7, after "bed" insert *at the same level*;

and that the said Letters Patent should be read with these corrections therein that the same may conform to the record of the case in the Patent Office.

Signed and sealed this 27th day of June, A. D. 1950.

[SEAL]

THOMAS F. MURPHY,
*Assistant Commissioner of Patents.*